(12) United States Patent
Mooney et al.

(10) Patent No.: US 11,494,841 B2
(45) Date of Patent: Nov. 8, 2022

(54) SYSTEM AND METHOD FOR MULTIMODAL REFERENCE DATA CONTRIBUTION AND MANAGEMENT USING STRAIGHT THROUGH PROCESSING

(71) Applicant: JPMorgan Chase Bank, N.A., New York, NY (US)

(72) Inventors: Robert Mooney, Kildare (IE); Ciaron Nixon, Glasgow (GB); Martin Game, Auchterarder (GB); Viktoria Freud, Brooklyn, NY (US); Swati Katare, Jersey City, NJ (US); David Greig, Torrance (GB); Vishakarajan Rajendran, Jersey City, NJ (US); Anant N Karandikar, Palatine, IL (US); Tanmay Patwardhan, Jersey City, NJ (US); Barry Corrigan, Kilmarnock (GB); Anupam Bansal, Jersey City, NJ (US); Sudheer Kumar Jami, Bournemouth (GB); Sunil Nair, River Vale, NJ (US); George I Brandman, Larchmont, NY (US); James Trait, Landenberg, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 54 days.

(21) Appl. No.: 17/220,273

(22) Filed: Apr. 1, 2021

(65) Prior Publication Data
US 2022/0318904 A1 Oct. 6, 2022

(51) Int. Cl.
G06Q 40/04 (2012.01)
G06Q 40/00 (2012.01)
(Continued)

(52) U.S. Cl.
CPC ......... *G06Q 40/04* (2013.01); *G06F 16/2365* (2019.01); *G06F 16/2379* (2019.01); *G06F 16/256* (2019.01); *G06Q 40/12* (2013.12)

(58) Field of Classification Search
CPC .... G06Q 40/04; G06Q 40/12; G06F 16/2379; G06F 16/256; G06F 16/2365
(Continued)

(56) References Cited

U.S. PATENT DOCUMENTS 8,341,131 B2   12/2012   Cohen
8,392,363 B2   3/2013    Rangadass
(Continued)

FOREIGN PATENT DOCUMENTS

CN   104361424   5/2018

OTHER PUBLICATIONS

Stegmayer et al., "The agent routering process of a dynamic distributed decision support system", Journal of Computer Science & Technology: NA. Graduate Network of Argentine Universities with Computer Science Schools, October (Year: 2001).*

(Continued)

*Primary Examiner* — Frantzy Poinvil
(74) *Attorney, Agent, or Firm* — Greenblum & Bernstein, P.L.C.

(57) ABSTRACT

A system and method for multimodal contribution and management of multi-domainal reference data is disclosed. A processor executes an application that utilizes distribution and lookup services on an authoritative data cache to confirm that a reference data record or attribute does not exist and creates a message compliant with a standardized information message (SIM) format; and inspects the contents of the SIM to determine the domain of the data and transmits the message to a corresponding domainal reference data system of record among a plurality of reference data systems (Continued)

within a federated reference data system. A receiving domain system acts as a system of record to one or more reference data domain classes related to the reference data; and initiates the processes of storing, versioning, and publication of the reference data for the domain of reference data for which the reference data system is being designated a system of record.

20 Claims, 10 Drawing Sheets

(51) Int. Cl.
 *G06F 16/23* (2019.01)
 *G06F 16/25* (2019.01)
(58) Field of Classification Search
 USPC .................................................. 705/3–44
 See application file for complete search history.

(56) References Cited

U.S. PATENT DOCUMENTS

| | | | |
|---|---|---|---|
| 9,495,652 B1* | 11/2016 | Cook | G06Q 30/0201 |
| 9,501,515 B2 | 11/2016 | Tahiliani et al. | |
| 10,567,492 B1* | 2/2020 | Natarajan | H04L 63/0807 |
| 2004/0128390 A1* | 7/2004 | Blakley, III | H04L 63/0807 709/219 |
| 2010/0070448 A1* | 3/2010 | Omoigui | H01L 27/14645 706/55 |
| 2010/0235844 A1* | 9/2010 | Arwe | G06F 9/50 718/100 |
| 2011/0137877 A1* | 6/2011 | Strassn | G06Q 10/00 707/694 |
| 2014/0258172 A1* | 9/2014 | Roach | G06Q 10/067 705/348 |
| 2015/0271668 A1* | 9/2015 | Sun | H04W 12/04 455/411 |
| 2017/0140015 A1 | 5/2017 | Rangadass | |

OTHER PUBLICATIONS

Wilner et al., Using Semantic Web Technologies to Query and Manage Information within Federated Cyber-Infrastructures, Data 2.3 MDPI AG, September (Year: 2017).*

* cited by examiner

SYSTEM AND METHOD FOR MULTIMODAL REFERENCE DATA CONTRIBUTION AND MANAGEMENT USING STRAIGHT THROUGH PROCESSING

TECHNICAL FIELD

This disclosure generally relates to data processing and management, and, more particularly, to methods and apparatuses for implementing a multimodal contribution module to enable just-in-time reference data availability and provides a platform for controlling data contribution and management across multiple reference data systems and domains based on real-time events.

BACKGROUND

Storing and distributing reference data for a variety of uses (e.g., front, middle, and back office functions) in a large multi-line of business financial organization may prove to be significantly challenging and time consuming. Reference data (e.g., financial instrument reference data) may be varied depending on the asset classes in question. For example, while there is significant breadth within exchange traded instrument data, there is substantially more data complexity in non-exchange traded assets (e.g., Over the Counter Instruments, Private Equity, Fund of Funds, non-market traded assets, etc.) which are often stated against two or more trading parties.

Sourcing such data may also prove to be problematic as reference data (e.g., financial instrument reference data) can be obtained from multiple external source systems, internal systems, and hybrids of internal and external systems. As a result, the channels through which this data arrives may also be broad and may include and be embedded within actual transactional data (e.g. financial positions and balances, pre-trade, post-trade and investment research).

When this data becomes unavailable for trade booking, research, performance, and risk calculations, it may cause a trade failure, a consequential high degree of operational intervention and data duplication and/or operational risk.

Conventional systems utilize a single centralized system of record which have multiple drawbacks. These include brittle model representations due to attempting to utilize a single physical model for all reference data within a reference data domain (e.g. financial instrument data) and suffer from time-to-market issues due to the change management of a single data model and repository.

SUMMARY

The present disclosure, through one or more of its various aspects, embodiments, and/or specific features or sub-components, provides, among other features, various systems, servers, devices, methods, media, programs, and platforms for implementing a multi-domainal reference data management module for controlling data governance of multi-domainal reference data based on real-time events. This enables reliable creation, versioning, storage and update in a manner for supporting front to back office requirements, but the disclosure is not limited thereto. The present disclosure, through one or more of its various aspects, embodiments, and/or specific features or sub-components, also provides, among other features, various systems, servers, devices, methods, media, programs, and platforms for implementing a multi-domainal reference data management module for controlling data governance of multi-domainal reference data. Modes of operation include real-time events that supports intra-day, on demand data; supports real time data acquisition during time of trade; supports reference data issuance (for internally issuing reference data—before the market data becomes available); increases operational STP (Straight Through Processing); improves STP of trade data by adding reference data without operational intervention ("fast-adding"), but the disclosure is not limited thereto.

According to an aspect of the present disclosure, a method for controlling data contribution and management of multi-domainal reference data by utilizing one or more processors and one or more memories is disclosed. The method may include: executing an application that utilizes distribution services and a data cache to confirm that reference data does not already exist against specified search criteria; creating a message compliant with a standardized information message (SIM) format, wherein the SIM is a standard structured message which includes all data attributes to derive and/or represent one or more reference data records corresponding to the reference data; transmitting a message to a corresponding primary system of record among a plurality of domainal systems (federated reference data systems) of record which act as a system of record to one or more reference data domains; and causing the federated reference data systems to execute the processes of storing and publication of reference data for the domains of reference data for which the supplied reference data system is a system of record.

According to another aspect of the present disclosure, the application may include integration with or the inclusion of a trade processing application or a middle office application or a back-office application utilized in accounting processes, but the disclosure is not limited thereto.

According to a further aspect of the present disclosure, the method may further include acquiring real time data corresponding to the reference data from a financial trade instruction.

According to yet another aspect of the present disclosure, the method may further include contributing data corresponding to the reference data through a single straight through processing (STP) interface in the format of standardized information model for contribution to a correct reference data system of record.

According to another aspect of the present disclosure, the method may further include persisting, by one or more of the systems of record among the federated reference data systems, the contributed data as-is to a staging area; and merging or matching the contributed data with vendor data.

According to a further aspect of the present disclosure, the method may further include: validating the contributed data by checking that a duplicate reference data does not already exist; and assigning one or more globally unique identifiers (GUIDs) to the contributed data based on validating the contributed data.

According to yet another aspect of the present disclosure, the method may further include over-writing previously contributed data in whole or in part with data acquired at a later time from a configurable set of internal or external data sources. The over-write can occur on one or more data records in whole or in part (at the attribute level) enabling the flexibility for certain fields to be excluded from data over-writes.

According to a further aspect of the present disclosure, when a newly identified reference data record or attribute is included in a financial trade instruction, the method may further include polling market data systems on demand to refresh one or more systems of record among the reference data systems with the most recent data.

According to another aspect of the present disclosure, a system for controlling data contribution and management of multi-domainal reference data is disclosed. The system may include: a plurality of integrated reference data systems operating as a federated reference data system; and a processor coupled to the plurality of reference data systems via a communication network, wherein the processor may be configured to: execute an application that utilizes distribution services and a data cache to confirm that reference data does not exist; create a message compliant with a standardized information message (SIM) format, wherein the SIM is a standard structured message which includes all data attributes to derive, and/or represent an reference data record corresponding to the reference data; transmit the message to a corresponding federated reference data system among the plurality of reference data systems which acts as a system of record to one or more reference data domain classes related to the reference data; and cause the federated reference data system to execute the processes of storing, versioning, and publication of reference data for the classes of reference data for which the federated reference data system is being designated a system of record.

According to a further aspect of the present disclosure, the processor may be further configured to invoke a reference data system of record to obtain real time data corresponding to one or more domains of reference data during time of a financial trade instruction.

According to yet another aspect of the present disclosure, the processor may be further configured to contribute data corresponding to the reference data through a single straight through processing (STP) interface in a well described standardized information model (SIM) format for contribution to the correct reference data systems amongst a plurality of reference data systems.

According to another aspect of the present disclosure, the processor may be further configured to: cause the federated reference data system to persist the contributed data as-is to a staging area; and merge or match the contributed data obtained from other sources.

According to a further aspect of the present disclosure, the processor may be further configured to: validate the contributed data by checking that duplicate reference data does not exist; and assign e or more globally unique identifiers (GUIDs) to the contributed data based on validating the contributed data.

According to yet another aspect of the present disclosure, the processor may be further configured to: over-write the contributed data in whole or part with data obtained at a later point in time from another internal or external data source and that a configurable set of records and or attributes can be locked preventing contributed data being overwritten by more recent data.

According to an additional aspect of the present disclosure, when a newly identified reference data record or attribute is included in a financial trade instruction, the processor may be further configured to poll other data systems on demand to refresh the system of record amongst the federated reference data systems with the most recent data.

According to yet another aspect of the present disclosure, a non-transitory computer readable medium configured to store instructions for controlling data governance of multi-domainal reference data is disclosed. The instructions, when executed, may cause a processor to perform the following: executing an application that utilizes distribution services and a data cache to confirm that supplied reference data (records, attributes) does not already exist; creating a message compliant with a standardized information message (SIM) format, wherein the SIM is a standard structured message which includes all data attributes (supplied and derived) to represent a new reference data record corresponding to the supplied reference data; transmitting the message to a targeted reference data system amongst a plurality of interconnected reference data systems based on the contents of the SIM; and causing the targeted system of record to execute the processes of storing, aggregating, versioning and publishing of new reference data record(s) in a SIM.

According to a further aspect of the present disclosure, the instructions, when executed, may cause the processor to further perform: extracting supplied reference data from real time and/or shadow copies of one or more financial trade instructions.

According to yet another aspect of the present disclosure, the instructions, when executed, may cause the processor to further perform: contributing data corresponding to the reference data through a single straight through processing (STP) interface in a standardized information model (SIM) for contribution to a targeted reference data system based on the contents of the SIM.

According to another aspect of the present disclosure, the instructions, when executed, may cause the processor to further perform: causing the federated reference data system to persist the contributed data as-is to staging area; and merging or matching the contributed data with vendor data.

According to a further aspect of the present disclosure, the instructions, when executed, may cause the processor to further perform: validating the contributed data by checking that a duplicate reference data does not already exist; and assigning one or more globally unique identifiers (GUIDs) to the contributed data based on validating the contributed data.

According to yet another aspect of the present disclosure, the instructions, when executed, may cause the processor to further perform: over-writing previously contributed data with data supplied or obtained at a later point from an internal or external data system and that the over-writing of data can be limited and configured to a subset of the reference data records attributes.

According to an additional aspect of the present disclosure, when newly identified reference data is included in a financial trade instruction, the instructions, when executed, may cause the processor to further perform: polling market data systems on demand to refresh a system of record amongst a plurality of reference data systems with the most recently acquired data.

BRIEF DESCRIPTION OF THE DRAWINGS

The present disclosure is further described in the detailed description follows, in reference to the noted plurality of drawings, by way of non-limiting examples of preferred embodiments of the present disclosure, in which like characters represent like elements throughout the several views of the drawings.

DETAILED DESCRIPTION

Figure 1:
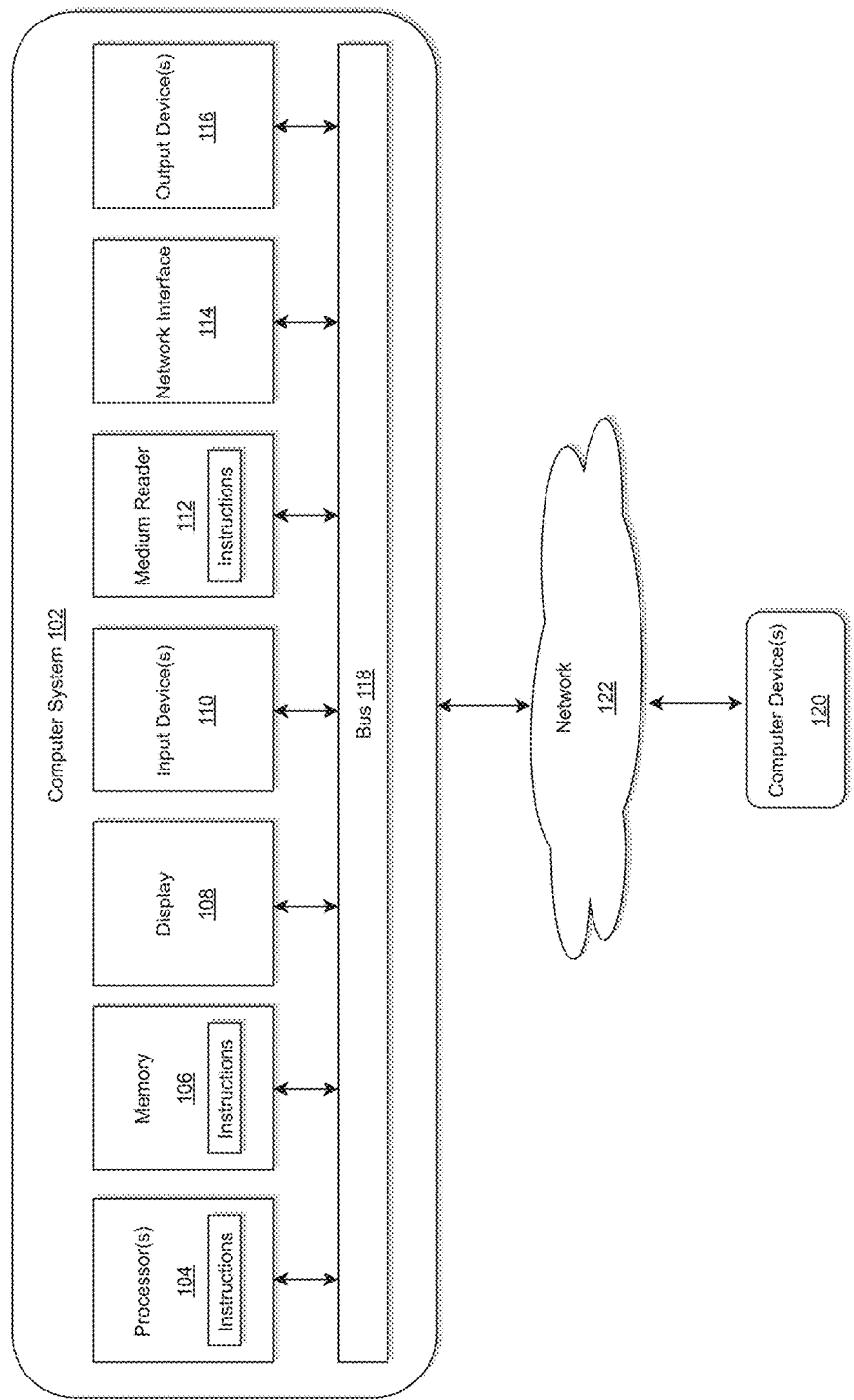
FIG. 1 illustrates a computer system for controlling data governance of multi-domainal reference data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein for controlling data governance of multi-domainal reference data, but the disclosure limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104, The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT) a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate hat the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, any other device that is capable of executing a set of instructions, sequential or otherwise, that specify actions to be taken by that device. Of course, those skilled in the art app ate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant o be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionalities as described herein, and a processor described herein may be used to support a virtual processing environment.

Figure 2:
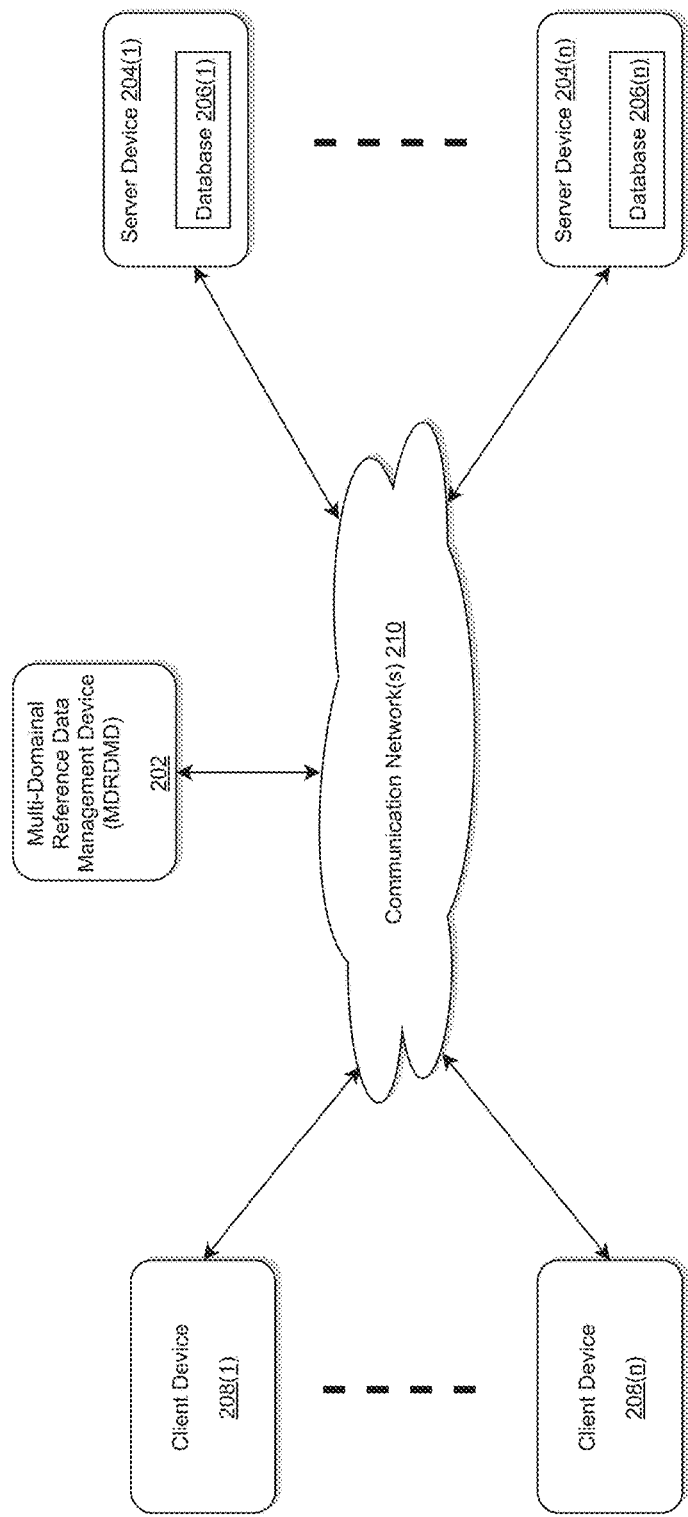
FIG. 2 illustrates an exemplary diagram of a network environment with a multi-domainal reference data management device in accordance with an exemplary embodiment.

Referring to FIG. 2, a schematic of an exemplary network environment 200 for implementing a multi-domainal reference data management device (MDRDMD) of the instant disclosure is illustrated.

Conventional system, that does not implement an MDRDMD of the instant disclosure, may not be able to automatically handle and process a vast amount of data in a quick and expedited manner and manage quality of data received, leading to wasting computer resources and a significant delay in processing data flowing between a plurality of computing devices.

According to exemplary embodiments, the above-described problems associated with conventional approach of generating presentations may be overcome by implementing an MDRDMD 202 as illustrated in FIG. 2 that may provide a platform for implementing the MDRDMD 202 which may automatically handle and process a vast amount of data in a quick and expedited manner and manage quality of data received, thereby significantly increasing data processing speed and significantly reducing lapse time that tray be necessary to manage data quality of data that is flowing between a plurality of computing devices, but the disclosure is not limited thereto.

For example, the various aspects, embodiments, and/or specific features or sub-components of the instant disclosure, provide, among other features, various systems, servers, devices, methods, media, programs, and platforms for implementing a data contract management module for automatic enforcement of a data contract to significantly increase data processing speed and significantly reduce lapse time that may be necessary to manage data quality of data that is flowing between a plurality of computing devices thereby improving computer functionalities of a graphical user interface (GUI), significantly reducing utilization of computer resources, and reducing utilization of memory spaces thereby maintaining optimum memory spaces for other computer processing algorithms, but the disclosure is not limited thereto.

The MDRDMD 202 may be the same or similar to the computer system 102 as described with respect FIG. 1.

The MDRDMD 202 may store one or more applications that can include executable instructions that, when executed by the MDRDMD 202, cause the MDRDMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MDRDMD 202 itself, may be located in virtual server(s) running in a cloud-based computing environment rather than being tied to one or more specific physical network computing devices. Also, the application(s) may be running in one or more virtual machines (VMs) executing on the MDRDMD 202. Additionally, in one or more embodiments of this technology, virtual machine(s) running on the MDRDMD 202 may be managed or supervised by a hypervisor.

In the network environment 200 of FIG. 2, the MDRDMD 202 is coupled to a plurality of server devices 204(1)-204(n) that hosts a plurality of databases 206(1)-206(n) including adaptive data storages, and also to a plurality of client devices 208(1)-208(n) via communication network(s) 210. A communication interface of the MDRDMD 202, such as the network interface 114 of the computer system 102 of FIG. 1, operatively couples and communicates between the MDRDMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MDRDMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MDRDMD 202 may be a standalone device or integrated with one or more other devices or apparatuses, such as one or more of the server devices 204(1)-204(n), for example. In one particular example, the MDRDMD 202 may be hosted by one of the server devices 204(1)-204(n), and other arrangements are also possible. Moreover, one or more of the devices of the MDRDMD 202 may be in the same or a different communication network including one or ire public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MDRDMD 202 via the communication network(s) 210 according to the HTTP-based HTTPS-based, and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a primary/secondary approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MDRDMD 202 that may efficiently provide a platform for implementing the MDRDMD 202 which may be configured to automatically handle and process a vast amount of data in a quick and expedited mariner and manage quality of data received, thereby significantly increasing data processing speed and significantly reducing lapse time that may be necessary to manage data quality of data that is flowing between a plurality of computing devices, but the disclosure is not limited thereto.

The client devices 208(1)-208(n) may run interface applications, such as standard web browsers or standalone client applications, which may provide an interface to communicate with the MDRDMD 202 via the communication network(s) 210 in order to communicate user requests. The client devices 208(1)-208(n) may further include, among other features, a display device, such as a display screen touchscreen, and/or an input device, such as a keyboard, for example.

Although the exemplary network environment 200 with the MDRDMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MDRDMD 202, the server devices 204(1)-204(n), or the client devices 208(1)-208(n), for example, may be configured to operate as virtual instances on the same physical machine. For example, one or more of the MDRDMD 202, the server devices 204(1)-204(n), or the client devices 208(1)-208(n) may operate on the same physical device rather than as separate devices communicating through communication network(s) 210. Additionally, there may be more or fewer MDRDMDs 202, server devices 204(1)-204(n), or client devices 208(1)-208(n) than illustrated in FIG. 2. According to exemplary embodiments, the MDRDMD 202 may be configured to send code at run-time to remote server devices 204(1)-204(n), but the disclosure not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
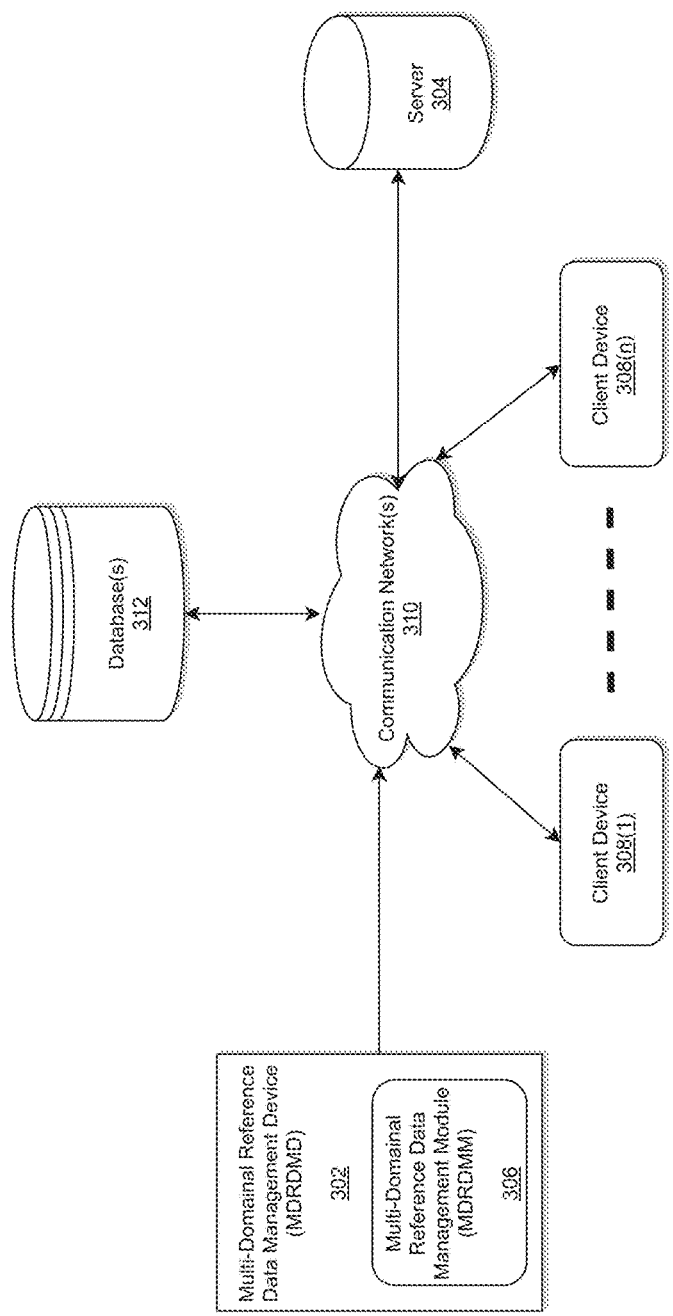
FIG. 3 illustrates a system diagram for implementing a multi-domainal reference data management device having is multi-domainal reference data management module in accordance with an exemplary embodiment.

FIG. 3 illustrates a system diagram 300 for implementing an MDRDMD having a multi-domainal reference data management module (MDRDMM) in accordance with an exemplary embodiment.

As illustrated in FIG. 3, the MDRDMD 302 including the MDRDMM 306 may be connected to a server 304, and a repository 312 via a communication network 310. The MDRDMD 302 may also be connected to a plurality of client devices 308(1)-308(n) via the communication network 310, but the disclosure is not limited thereto. According to exemplary embodiments, the MDRDMM 306 may be implemented within the client devices 308(1)-308(n), but the disclosure is not limited thereto. According to exemplary embodiments, the client devices 308(1)-308(n) may be multi-domainal federated reference data systems, but the disclosure is not limited thereto.

According to exemplary embodiment, the MDRDMD 302 is described and shown in FIG. 3 as including the MDRDMD 306, although it may include other rules, policies, modules, databases, or applications, for example. According to exemplary embodiments, the repository 312 may be embedded within the MDRDMD 302. Although only one repository 312 is illustrated in FIG. 3, according to exemplary embodiments, a plurality of repositories 312 may be provided. The repository 312 may include one or more memories configured to store trade capture data, operational capture data, other contributor data, etc., but the disclosure is not limited thereto. For example, the repository 312 may include one or more memories configured to store information including: rules, programs, requirements, configurable threshold values defined by a product team to validate against service level objective (SLO), machine learning models, log data, hash values, etc., but the disclosure is not limited thereto. According to exemplary embodiments, the MDRDMM 306 may be configured to be storage platform agnostic—configured to be deployed across multiple storage layers.

According to exemplar embodiments, the MDRDMM 306 may be configured to receive continuous feed of data from the repository 312 via the communication network 310.

As will be described below, the MDRDMM 306 may be configured to execute an application that utilizes distribution services or an authoritative data sources cache to confirm that reference data does not already exist; create a message compliant with a standardized information message (SIM)

format, wherein the SIM is a standard structured message which includes all data attributes to derive and/or represent one or more reference data records corresponding to the reference data; transmitting a message to a corresponding primary system of record among a plurality of domainal systems (federated reference data systems) of record which act as a system of record to one or more reference data domains; and causing the federated reference data systems to execute the processes of storing and publication of reference data for the domains of reference data for which the supplied reference data system is a system of record.

Maintaining and having access to consistent reference data is critical in order to be able to manage the front, middle and back-office processes in a large trading organization. Where reference data is deficient, internal operational processes require manual intervention in trade processing trade repair/rejection), accounting (position breaks) and client and third-party reporting (books and records, regulatory reporting). Such failures incur cost through missed service level agreements (SLAB), increased need for resourcing for break resolution, and increases operational/reputational risk.

According to exemplary embodiments, the MDRDMM 306 provides a platform to enable reference data records to be contributed, stored and distributed in support of ensuring high STP rates and so that data is pervasively and consistently available to all consuming functions. The processes implemented by the MDRDMM 306 may be dependent on a federated system of record approach where cooperating systems are designated a system of record of data depending on a pre-defined data boundary set (e.g., reference data asset class, line of business account type, external client/party) which will be further described in details with reference to FIGS. 4-10.

Reference data may originate from multiple channels. Reference data can be obtained through a multitude of sources including but not limited to vendor feeds, exchange feeds, pre-market/issuance notifications, and client contributed data feeds. Ensuring that all of these sources of data by domain can be merged and curated is a significant problem in the reference data management lifecycle in conventional art. This is primarily due to the variation in sources, formats, data timeliness and symbology. To overcome this challenge of conventional art, according to exemplary embodiments, the MDRDMM 306 creates a globally unique reference data domain identification scheme in a reference data system e.g., globally unique account ID, globally unique reference data ID and globally unique party ID etc.

In addition, reference data requirements may vary by domain and secondary characteristics such as Line of Business, Asset Class, and Service Relationships. There may be a significant breadth of data variation even within domains. For example, within the domain of financial instrument reference data, exchange traded reference data may be significantly different to complex assets (OTCs, Private Equity, Fund of Funds and non-market traded assets) which are often stated against two or more trading parties. The operational systems for complex assets (OTCs) particularly often persist (as a golden source) contract terms and conditions and exchanged cash flows. For that reason, in any reference data domain there may be a significant benefit to reduce store-and-forward/data duplication by elevating such operational systems to act in reference data management capacity.

To overcome this challenge, according to exemplary embodiments, the MDRDMM 306 utilizes a standard model format which contains the totality of data attribution to adequately represent a data domain message record against a given category within the domain. In this exemplary embodiment, the MDRDMM 306 divides a domain of reference data in to boundary sets. A boundary set is logical subdomain which represents the grain of data distributed in the federated system. For example, in the financial instrument reference data domain, the MDRDMM 306 creates boundary sets per asset class (Equity, Fixed Income, Index, OTC etc.) which are related by a common model format.

Inconsistent or unavailable reference data may reduce straight through processing (STP) rates (increases necessity for manual intervention to repair a trade) and/or risks meeting a Service Level Agreement with a client or operational process. These channels may include: Data Vendors received on a variety of proprietary formats; Trade Capture Processes (from trade capture processes that supply different symbologies and levels of detail on domain/boundary set); and Internal Operational Processes (organizations can create reference data for issuance and/or modelling/research. Such reference data although not market traded need to be available to multiple internal systems consistently).

To overcome this challenge, according to exemplary embodiments, the MDRDMM 306 is configured to ingest data consistently and without duplication through a single optimized process that must cater to data contributed reactively at the time of trade and operational setup.

Reference data may undergo gradual standardization. For example, reference data constructed in a financial institution may not be available to the market (and subsequently not within market data feeds) either at all or for some days. In this instance a pre-market version of the reference data may be eventually fed by a later market data acquisition. To overcome this challenge, according to exemplary embodiments, the MDRDMM 306 provides a platform to over-write data that has been contributed at the time of trade or operational setup with standardized data received from vendors.

The plurality of client devices 308(1)-308(n) are illustrated as being in communication with the MDRDMM 306. In this regard, the plurality of client devices 308(1)-308(n) may be "clients" of the MDRDMM 306 and are described herein as such. Nevertheless, it is to be known and understood that the plurality of client devices 308(1)-308(n) need not necessarily be "clients" of the MDRDMM 306, or any entity described in association therewith herein. Any additional or alternative relationship may exist between either or snore of the plurality of client devices 308(1)-308(n) and the MDRDMM 306, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, exemplary embodiment, either one or more of the plurality of client devices 308(1)-308(n) may communicate with the MDRDMM 306 via broadband or cellular communication. Of course, these embodiments are merely exemplary and are not limiting or exhaustive.

Figure 4:
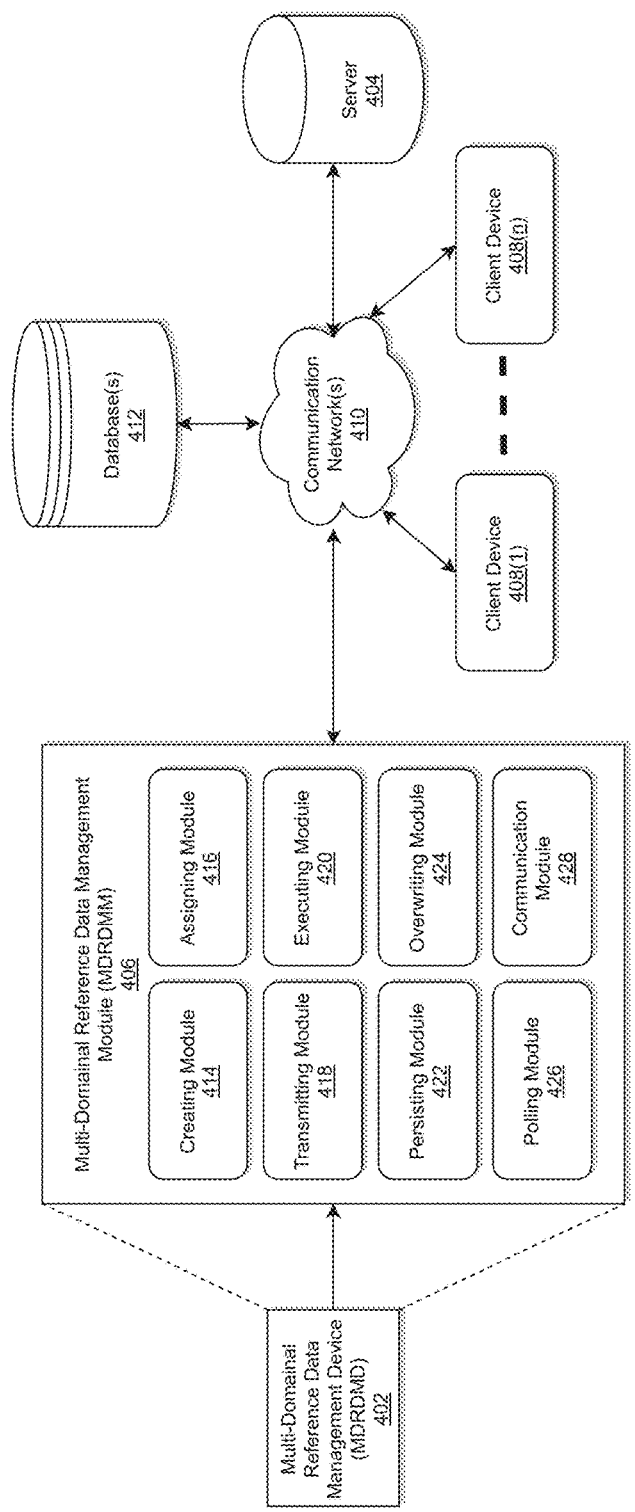
FIG. 4 illustrates a system diagram having a multi-domainal reference data management device of FIG. 3 in accordance with an exemplary embodiment.

FIG. 4 illustrates a system diagram having an MDRDMM of FIG. 3 in accordance with an exemplary embodiment.

As illustrated in FIG. 4, the system 400 may include an MDRDMD 402 within which an MDRDMM 406 may be embedded, a repository 412, a server 404, client devices 408(1)-408(n), and a communication network 410. According to exemplary embodiments, the MDRDMD 402, MDRDMM 406, repository 412, the server 404, the client devices 408(1)-408(n), and the communication network 410 as illustrated in FIG. 4 may be the same or similar to the MDRDMD 302, the MDRDMM 306, the repository 312, the server 304, the client devices 308(1)-308(n), and the communication network 310, respectively, as illustrated in FIG. 3.

According to exemplary embodiments, the repository 312, 412 may be a cloud-based repository that supports user authentication, repository security, and integration with existing databases and developments, but the disclosure is not limited thereto.

As illustrated in FIG. 4, the MDRDMM 406 may include a creating module 414, an assigning module 416, a transmitting module 418, an executing module 420, a persisting module 422, an overwriting module 424, a polling module 426, and a communication module 428. According to exemplary embodiments, the repository 412 may be external to the MDRDMD 402 may include various systems that are managed and operated by an organization. Alternatively, according to exemplary embodiments, the repository 412 may be embedded within the MDRDMD 402 and/or the MDRDMM 406.

The process may be executed via the communication module 428 and the communication network 410 which may comprise plural networks as described above. For example, in an exemplary embodiment, the various components of the MDRDMM 406 may communicate with the server 404, and the repository 412 via the communication module 428 and the communication network 410. Of course, these embodiments are merely exemplary and are not limiting or exhaustive.

According to exemplary embodiments, the communication network 410 and the communication module 426 may be configured to establish a link between the repository 412, the client devices 408(1)-408(n) and the MDRDMM 406.

According to exemplary embodiments, each of the creating module 414, assigning module 416, transmitting module 418, executing module 420, persisting module 422, overwriting module 424, polling module 426, and the communication module 428 may be implemented by microprocessors or similar, they may be programmed using software (e.g., microcode) to perform various function s discussed herein and may optionally be driven by firmware and/or software. Alternatively, each of the creating module 414, assigning module 416, transmitting module 418, executing module 420, persisting module 422, overwriting module 424, polling module 426, and the communication module 428 may be implemented by dedicated hardware, or as a combination of dedicated hardware to perform some functions and a processor (e.g., one or more programmed microprocessors and associated circuitry) to perform other functions. Also, according to exemplary embodiments, each of the creating module 414, assigning module 416, transmitting module 418, executing module 420, persisting module 422., overwriting module 424, polling module. 426, and the communication module 428 may be physically separated into two or more interacting and discrete blocks, units, devices, and/or modules without departing from the scope of the inventive concepts.

Figure 5:
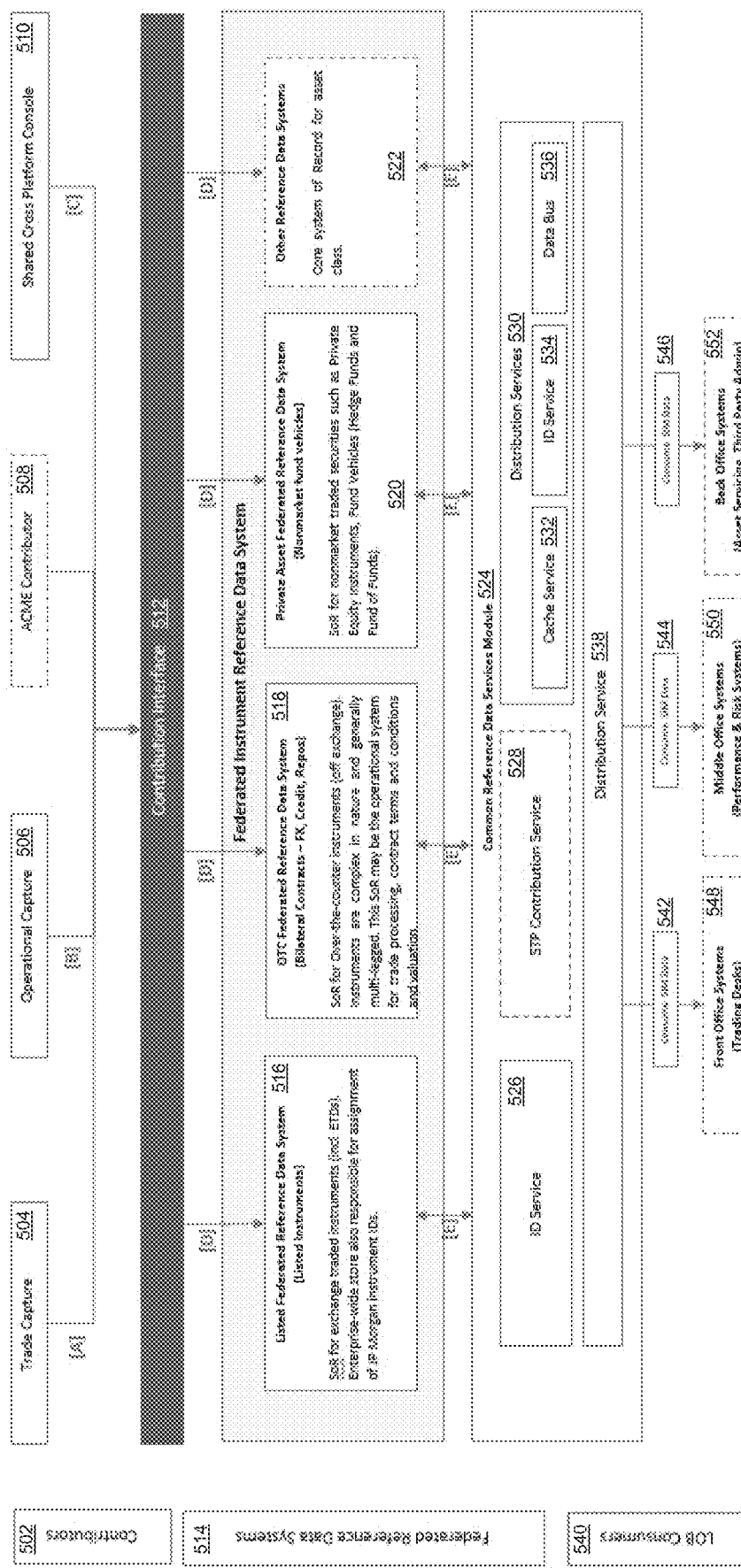
FIG. 5 illustrates an exemplary architecture of contribution to federated reference data systems in accordance with an exemplary embodiment.

FIG. 5 illustrates an exemplary architecture 500 of contribution to federated reference data systems in accordance with an exemplary embodiment. As illustrated in FIG. 5, contributors 502 may include trade capture 504, operational capture 506, ACME contributor 508 and shared cross platform 510, each of which are connected to a contribution interface 512. Federated Instrument Reference Data System 514 may include Listed Federated Reference Data System 516, OTC Federated Reference Data System 518, Private Asset Reference Data System 520, and other reference data systems 522.

According to exemplary embodiments, the listed federated reference data system 516 may be the system of record (SoR) for exchange traded reference data (including ETDs). Enterprise wide store also responsible for assignment of bank's reference data IDs.

According to exemplary embodiments, the OTC Federated Reference Data System 518 may be the SoR for over-the-counter reference data (off exchange). Reference data are complex in nature and generally multi-legged. This OTC Federated Reference Data System 518 may be the operational system for trade processing, contract terms and conditions and valuation.

According to exemplary embodiments, private asset federated reference data system 520 may be the SoR for non-market traded securities such as Private Asset Reference Data System data, Fund Vehicles (Hedge Funds and Fund of Funds).

According to exemplary embodiments, the other reference data systems 522 may be the core system of record for asset class.

Each of the listed federated reference data systems 516, OTC federated reference data system 518, private asset federated reference data system 520, and other systems of record 522 may be connected to a common reference data services module 524. The data services module 524 may include an ID service 526, STP contribution service 528, and a distribution service 530. The distribution service 530 may include a cache service 532, an ID service 534, and a data bus 536.

According to exemplary The LOB consumers 540 may consume SIM data from a distribution service 538. For example, front office systems (i.e., trading desks) 548 may receive SIM data 542 from the distribution service 538, the middle office systems (i.e., performance and risk systems) 550 may receive SIM data 544 from the distribution service, and the back office systems 552 (i.e., asset servicing, third party admin) 550 may receive SIM data 544 from the distribution service 538.

Figure 6:
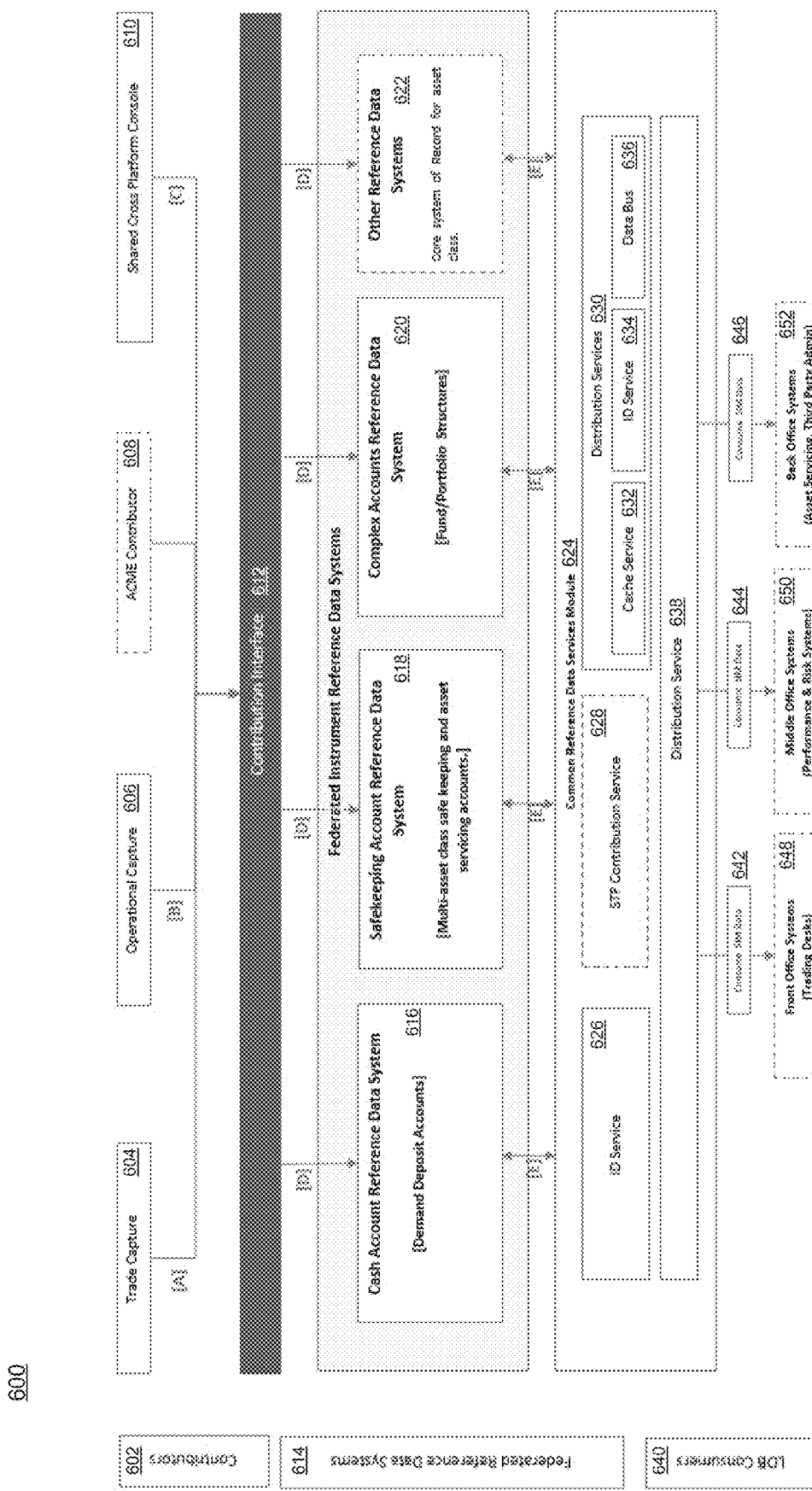
FIG. 6 illustrates an exemplary architecture of contribution to federated account reference data systems in accordance with an exemplary embodiment.

FIG. 6 illustrates an exemplary architecture 600 of contribution to federated account reference data systems in accordance with an exemplary embodiment.

As illustrated in FIG. 6, contributors 602 may include trade capture 604, operational capture 606, ACME contributor 608 and shared cross platform 610, each of which are connected to a contribution interface 612. Federated reference data systems 614 may include cash account (i.e., demand deposit accounts) reference data system 616, safekeeping account (i.e., multi-asset class safe keeping and asset servicing accounts) reference data system 618, complex accounts (i.e., fund/portfolio structures) 620, and other reference data systems of record 622.

Each of the cash account reference data systems of record 616, safekeeping account system of record 618, complex accounts 620, and other systems of record 622 may be connected to a common reference data services module 624. The data services module 624 may include an ID service 626, STP contribution service 628, and a distribution service 630. The distribution service 630 may include cache service 632, an ID service 634, and a data bus 636.

According to exemplary The LOB consumers 640 may consume SIM data from a distribution service 638. For example, front office systems (i.e., trading desks) 648 may receive SIM data 642 from the distribution service 638, the middle office systems (i.e., performance and risk systems) 660 may receive SIM data 644 from the distribution service, and the back office systems 662 (i.e., asset servicing, third party admin) 660 may receive SIM data 644 from the distribution service 638.

Referring FIGS. 4-6, according to exemplary embodiments, the executing module 420 of the MDRDMM 406 may execute an application that utilizes distribution services or an authoritative data sources cache to confirm that reference data does not already exist. According to exemplary embodiments, the application may be a contributing application that contributes reference data to the federated reference data systems as illustrated in FIG. 5. A contributing application can be any system or process but typically includes trade processing or middle/back office applications utilized in accounting processes, but the disclosure is not limited thereto.

According to exemplary embodiments, the creating module 414 may create a message compliant with a standardized information message (SIM) format, wherein the SIM is a standard structured message which includes all data attributes to derive and/or represent reference data record corresponding to the reference data.

According to exemplary embodiments, the transmitting module 418 may transmit the message to a corresponding federated reference data system among a plurality of reference data systems which acts as a system of record to one or more reference data domain classes related to the reference data. The executing module 420 may cause the federated reference data system to execute the processes of storing, versioning, and publication of reference data for the classes of reference data for which the federated reference data system is being designated a system of record. According to exemplary embodiments, the MDRDMM 406 may acquire real time data corresponding to the reference data during time of a trade.

According to exemplary embodiments, the MDRDMM 406 may allow contributing data corresponding to the reference data through a single straight through processing (STP) interface in a standardized reference data model for contribution to a correct asset class system of record.

According to exemplary embodiments, the persisting module 422 may cause the federated reference data system to persist the contributed data as-is to staging area; and merge or match the contributed data with vendor data.

According to exemplary embodiments, the MDRDMM 406 may validate the contributed data by checking that a duplicate reference data does not exist; and the assigning module 416 may assign a globally unique identifier (GUID) to the contributed data based on validating the contributed data.

According to exemplary embodiments, the overwriting module 424 may over write the contributed data by data at a later point by more accurate internal or external data which can over write the data attributes in whole or in part ensuring that internal fields can be locked which externally obtained data over-writes staler data.

According to exemplary embodiments, when a newly identified reference data is included in an externally executed trade, the polling module 426 may poll market data systems on demand to refresh the system record assign to the asset domain with the most recent data.

The functionalities of the MDRDMM 406 will be described in further details with reference to FIGS. 7-9.

Figure 7:
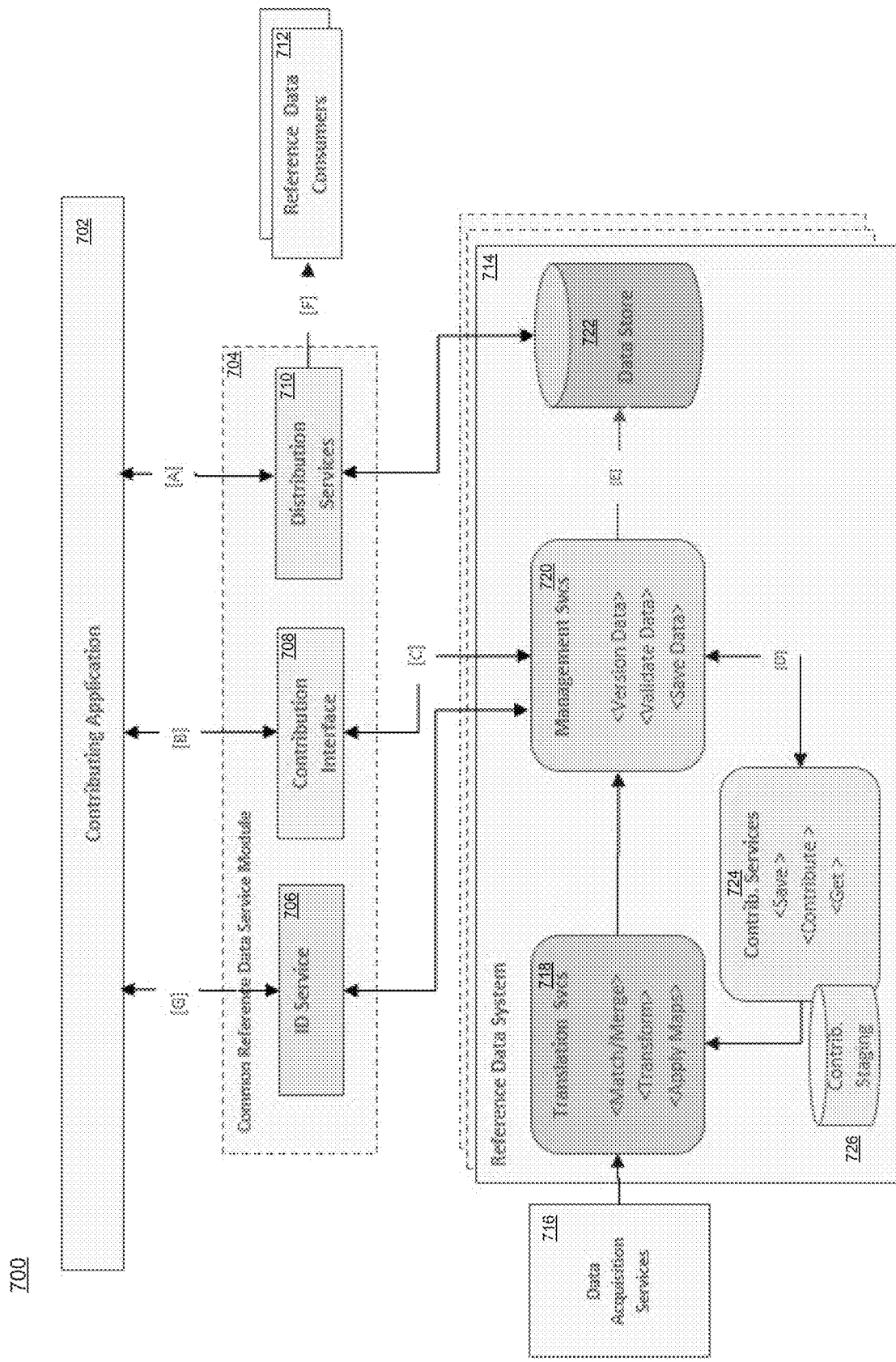
FIG. 7 illustrates an exemplary architecture of controlling data governance of multi-domainal reference data in whole or part by authorized boundary set contributors in accordance with an exemplary embodiment.

FIG. 7 illustrates an exemplary architecture 700 of controlling data governance of multi-domainal reference data in whole or part by authorized boundary set contributors in accordance with an exemplary embodiment.

As illustrated in FIG. 7, in [A], a contributing application 702 uses distribution services 710 or an authoritative data sources cache to confirm that the reference data does not already exist in the distribution services cache.

In [B] of FIG. 7, the contributing application 702 forms a message compliant with a SIM format and invokes the contribution interface 708. According to exemplary embodiments, the SIM is a standard structured message which includes all of the data attributes to derive and/or adequately represent reference data record.

As illustrated in FIG. 7, according to exemplary embodiments, a federated reference data system 714 may include translation services 718, management services 720, data store 722, contribution services 724 and contribution staging 726.

In [C] of FIG. 7, the contribution interface 708 inspects and forwards the request to an appropriate federated reference data system of record, for example, management service 720.

In [D] of FIG. 7, the SoR (i.e., the management service 720) persists the contributed data as-is to staging area (i.e., contribution staging 726) so that it can be merged with the vendor data and re-distributed as required.

In [E] of FIG. 7, the SoR (i.e., the management service 720) validates the contributed data, including duplicate reference data checks, assigns a globally unique id (GUID) and persists to the reference data system of record.

In [F] of FIG. 7, once a GUID is assigned and the data is persisted, the new reference data is distributed over a reference data interface for the consuming applications utilized by the reference data consumers 712.

In [G] of FIG. 7, the contributing application 702 is in a bidirectional communication with an ID service 706.

According to exemplary embodiments, the data acquisition services 716 may be in communication with the federated reference data systems of record 714.

Figure 8:
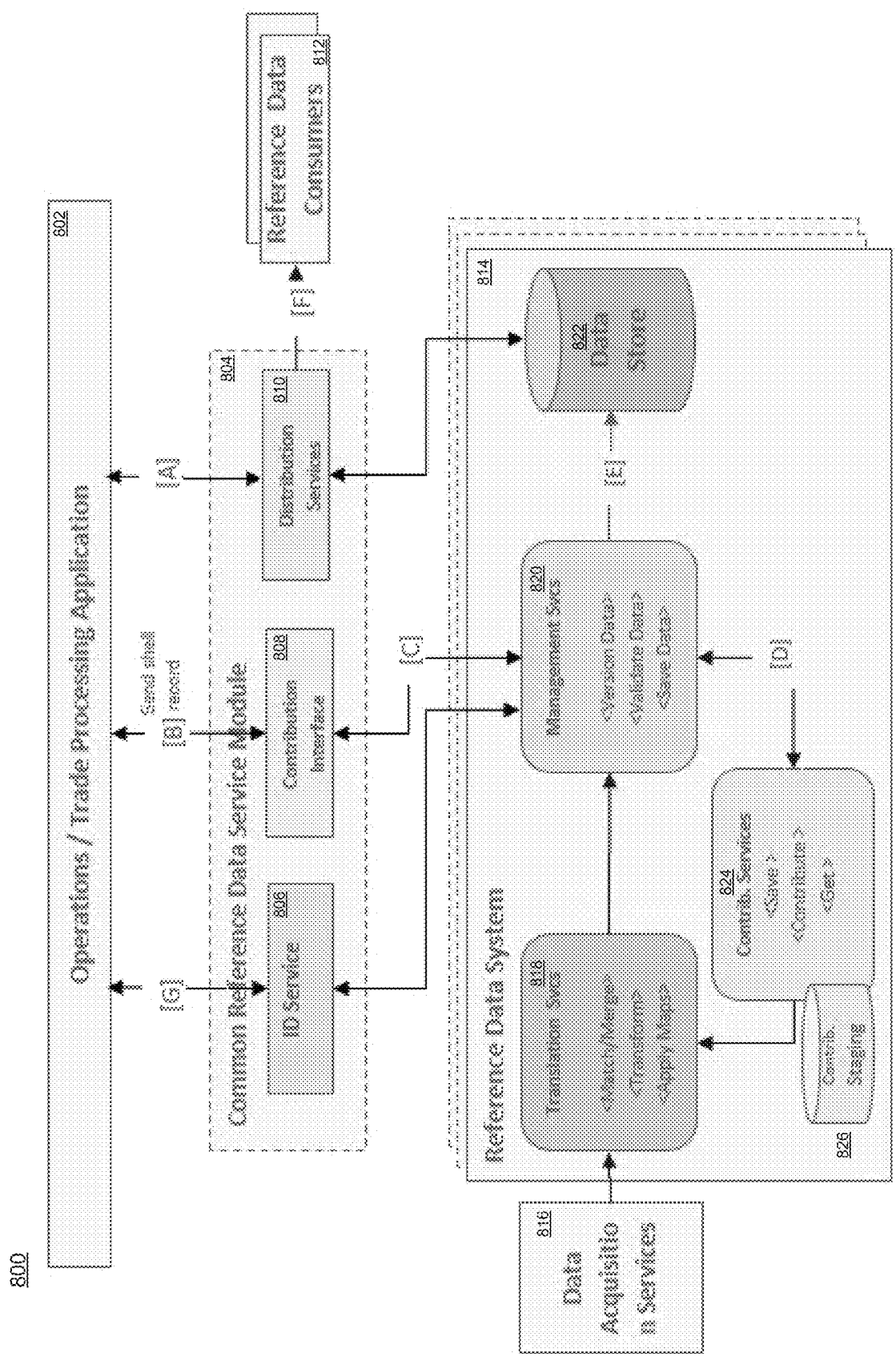
FIG. 8 illustrates an exemplary architecture of creating a shell reference data record at the time of trade in accordance with an exemplary embodiment.

FIG. 8 illustrates an exemplary architecture 800 of creating a shell reference data record at the time of trade in accordance with an exemplary embodiment.

As illustrated in FIG. 8, according to exemplary embodiments, a federated reference data system 814 may include translation services 818, management services 820, data store 822, contribution services 824 and contribution staging 826.

As illustrated in FIG, 8, in [A], contributing application (e.g., operations/trade processing application 802) uses distribution services 810 or an authoritative data sources cache to confirm that the record does not already exist in the distribution services cache using a set of standardized reference data identifiers including market and non-market IDs.

In [B] of FIG. 8, if the record does not exist, the data supplied in the trade message is used to create a minimum viable message for sending to the contribution interface 808. Attributes at the time of trade may include for example: Account Domain {client account ID(s), Client account name (s), Client Account Detail including domicile, currency} and Reference data Domain {reference data id, client reference data reference id, client/trade supplied names, asset type/classification, asset currency}.

In [C] of FIG. 8, the contribution interface 808 receives the minimal attribution in the prepared domain model format, inspects the message domain (Party, Reference data, Account) and sub Domain (e.g., for Account—Cash Account, Fund Account, Custody safekeeping account; for Reference data—Equity, Fixed Income, Contract, Fund Vehicle; Safekeeping Account) and forwards to the assigned system of record (SoR) for the domain and sub-domain.

In [D] of FIG. 8, the system of record (SoR) persists the contributed data as-is to staging area (e.g., contribution staging 826) so that it can be merged with the vendor data and re-distributed as required.

In [E] of FIG. 8, the SoR validates the contributed data, including duplicate reference data checks, requests/assigns a GUID and persists to the reference data system of record.

In [F] of FIG. 8, once a GUID is assigned and the data is persisted, the new reference data is distributed over the reference data interface for the consuming applications utilized by the reference data consumers 812.

In [G] FIG. 8, the contributing application (e.g., operations/trade processing application 802) is in a bidirectional communication with an ID service 806.

According to exemplary embodiments, the data acquisition services 816 may be in communication with the federated reference data systems of record 814.

Figure 9:
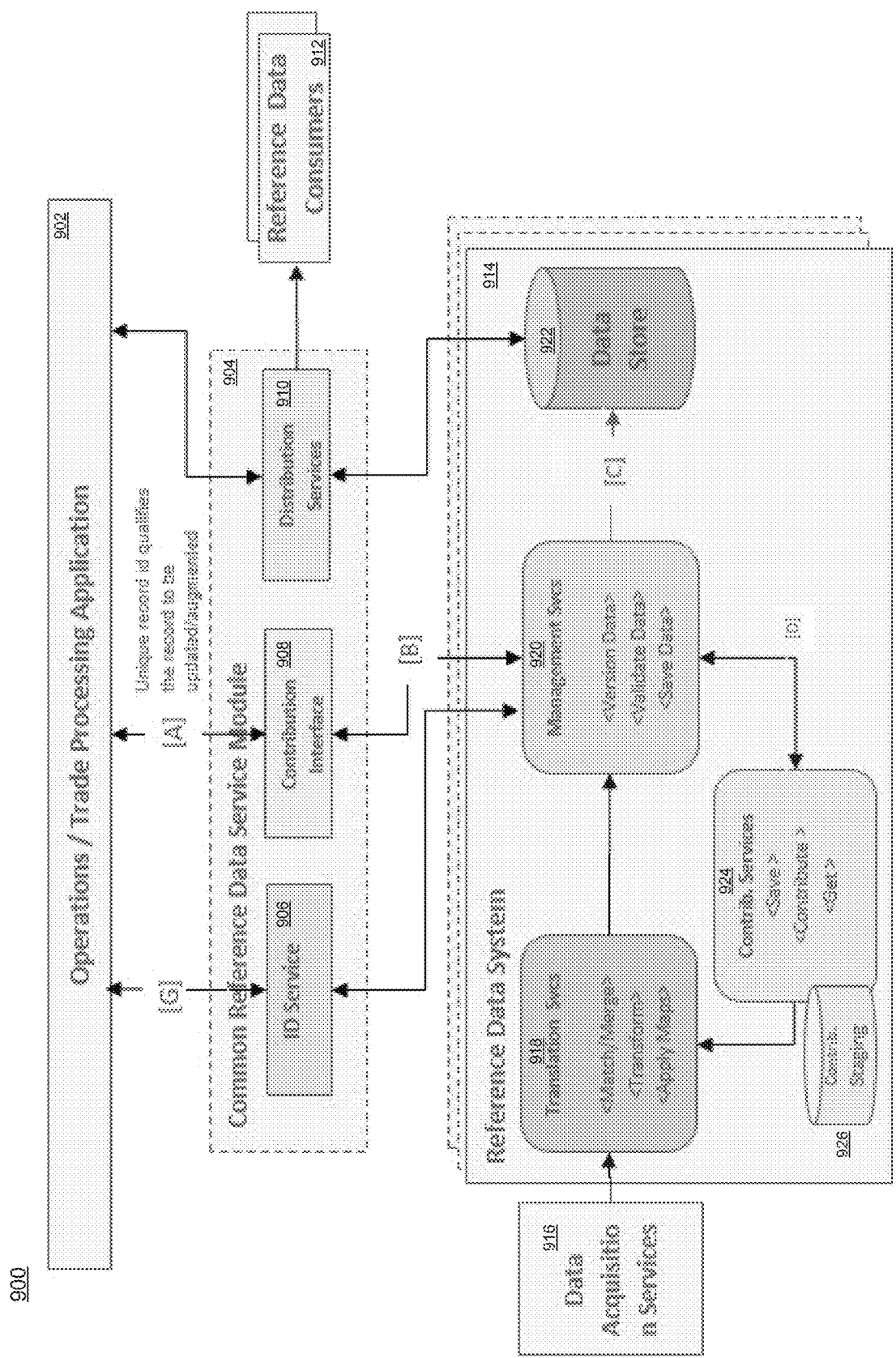
FIG. 9 illustrates an exemplary architecture that shows contribution with vendor takeover and partial contribution with over-write in accordance with an exemplary embodiment.

FIG. 9 illustrates an exemplary architecture 900 that shows contribution with vendor takeover and partial contribution with over-write in accordance with an exemplary embodiment.

As illustrated in FIG. 9, according to exemplary embodiments, a reference data system 914 may include translation services 918, management services 920, data store 922, contribution services 924 and contribution staging 926.

As illustrated in FIG. 9, in [A], a contributing application (e.g., operations/trade processing application 902) uses the contribution interface 908 to supply a set of data attributes to an existing reference data domain record. The existence of the record is known since the unique reference data ID is supplied to the contribution interface 908. Thus, no determination of the existence of the record is required. The attributes to be committed to the reference data record as passed to the contribution interface 908 along with the records globally unique ID.

In [B] of FIG. 9, the contribution interface 908 inspects and forwards the request to the appropriate federated reference data system service 920.

In [C] of FIG. 9, the SoR (i.e., the management service 920) validates the contributed data and the entitlement of the contributing system to commit the data, including duplicate reference data checks.

In [D] of FIG. 9, the SoR (i.e., the management service 920) persists the contributed data as-is to staging area (i.e., contribution staging 926) so that it can be merged with the vendor data and re-distributed as required [D].

According to exemplary embodiments, at some later point, the data first contributed by one mode may be overwritten or augmented by another mode. For example, data is ingested to the management service 920 from irony a vendor source and augmented with an internal operation system data. Subsequently over-written by a refresh of vendor data. Also, data is first sent from an operational source (as a shell record or a full contributed record) and later refreshed by vendor sourced data e.g., an Equity Linked Note may be created/novated by a trading desk and set up in a SoR and latter fed from a market data feed.

In [G] of FIG. 9, the contributing application (e.g., operations/trade processing application 902) is in a bidirectional communication with an ID service 906.

According to exemplary embodiments, the data acquisition services 916 may be in communication with the federated reference data system 914.

Referring back to FIGS. 7-9, the ID Service 706, 806, 906 may be responsible for providing globally unique IDs to reference data so that each reference data record is uniquely identifiable by reference data consumers. The ID service 706, 806, 906 may be used to generate reference data IDs at different levels of granularity or different schemes. These IDs can be utilized for situations to enforce a common key across all asset classes on occasions where market IDs are sparse or irregularly defined.

The contribution interface 708, 808, 908, according to exemplary embodiments, may be an automated service/endpoint which is responsible for the receipt of reference data (file/message), the determination of the domain type to which the message relates and the redirection of the message to the appropriate federated reference data system of record.

The distribution services 710, 810, 910, according to exemplary embodiments, may be a composite set of services which include an ingestor service for writing records to a highly accessible cache, a caching service which stores single information model and a distribution service which supports message publication, subscription and data request/response.

The single information model as described herein may be a standardized version of a reference data dataset which can be used for the transmission of reference data so that (1) data consumers may be agnostic to the origin of the reference data; and (2) data consumers may maintain a standardized data contract with all publishing federated reference data systems of record.

The federated reference data system as described herein may be a system (one of potentially many) which is deemed to act as the system of record for one or more reference data domain classes. This system of record will be responsible for the storage, versioning and publication of reference data for the classes of reference data for which it is designated as system of record.

The management service 720, 820, 920, according to exemplary embodiments, may be a service within a federated reference data system (714, 814, 914) node which is responsible for merging, versioning, validating and saving data.

The translation services 718, 818, 918, according to exemplary embodiments, may be a service within a federated reference data system (714, 814, 914) node which is responsible for the extract, transformation and load of data from external data providers/contributors.

The contribution service 708, 808, 908, according to exemplary embodiments, may be a service within a federated reference data system (714, 814,914) node which is responsible for the receipt and processing of contributed data. The contribution service 708, 808, 908 is responsible for the persistence and save of this contributed data to a staging area (i.e., 726, 826, 926) so that this data can later be merged/matched with vendor data where the data will later be refreshed by other sources (e.g., vendors/exchange data etc.).

According to exemplary embodiments, multi-domainal federated reference data systems may include account reference data systems (data representing transactional accounts against which positions/balances are held and transactions can be executed), financial instrument reference data systems (data representing invested/investable assets that are both on and off exchange traded), party reference data systems (data representing the details of individuals and/or organizations internal and/or external to the organization), and other reference data domains.

Figure 10:
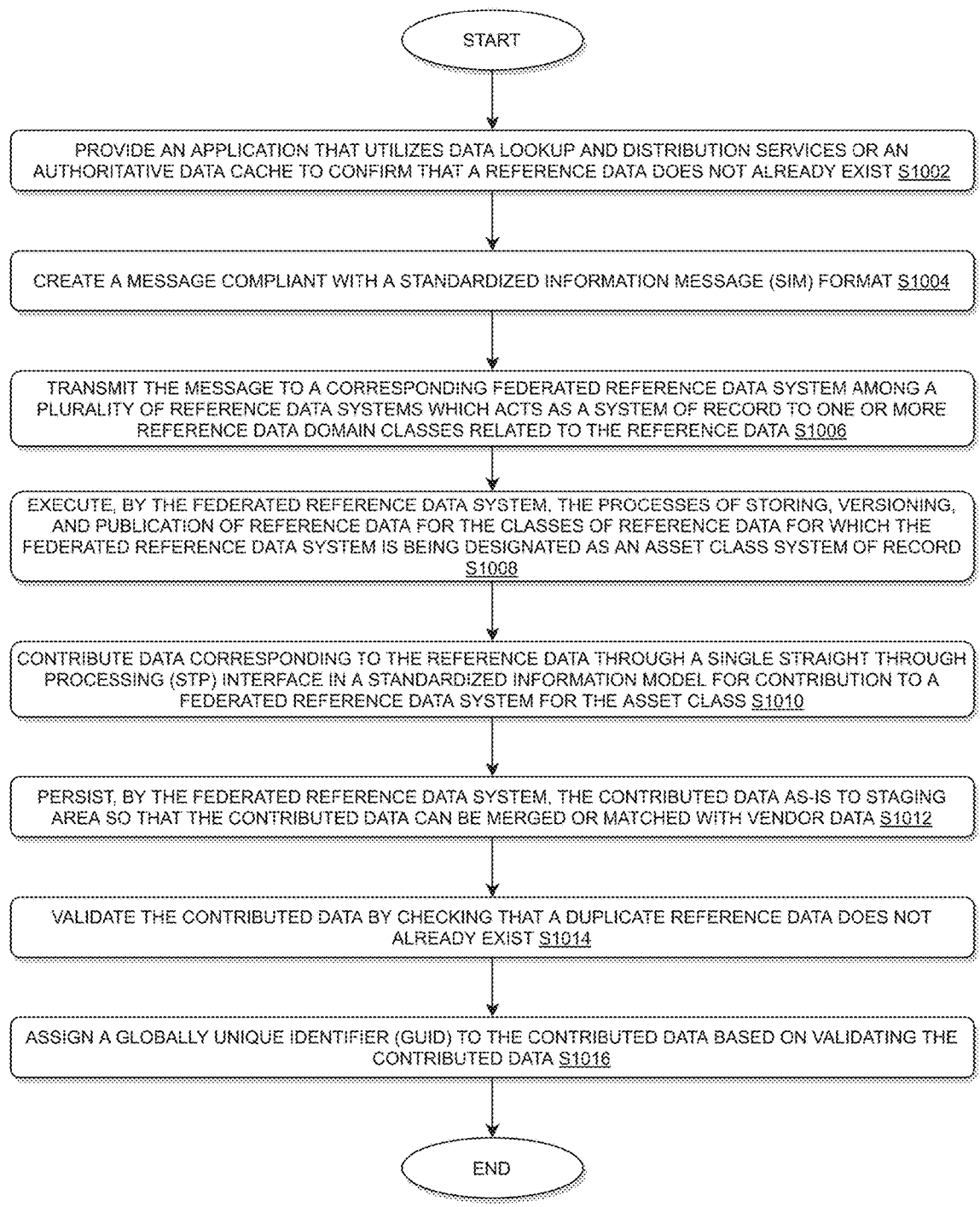
FIG. 10 illustrates a flow chart of controlling data governance of multi-domainal reference data in accordance with an exemplary embodiment.

FIG. 10 illustrates a flow chart of controlling data governance of multi domainal reference data in accordance with an exemplary embodiment.

At step S1002, the process 1000 may include executing an application that utilizes distribution services or an authoritative data sources cache to confirm that a reference data does not already exist.

At step S1004, the process 1000 may include creating a message compliant with a standardized information message (SIM) format, wherein the SIM is a standard structured message which includes all data attributes to derive and/or represent a reference data record corresponding to the reference data.

At step S1006, the process 1000 may include transmitting the message to a corresponding federated reference data system among a plurality of reference data systems which acts as a system of record to one or more reference data domain classes related to the reference data.

At step S1008, the process 1000 may include causing the federated reference data system to execute the processes of storing, versioning, and publication of reference data for the classes of reference data for which the federated reference data system is being designated an asset class system of record.

At step S1010, the process 1000 may include contributing data corresponding to the reference data through a single straight through processing (STP) interface in a standardized reference data model for contribution to a federated reference data system for the asset class.

At step S1012, the process 1000 may include persisting, by the federated reference data system, the contributed data as-is to staging area; and merging or matching the contributed data with vendor data.

At step S1014, the process 1000 may include validating the contributed data by checking that a duplicate reference data does not already exist.

At step S1016, the process 1000 may include assigning a globally unique identifier (GUID) to the contributed data based on validating the contributed data.

According to exemplary embodiments, the process 1000 may further include over writing the contributed data by data at a later point by more accurate internal or external data which can over write the data attributes in whole or in part ensuring that internal fields can be locked which externally obtained data over-writes staler data.

According to exemplary embodiments, when a newly identified reference data is included in an externally executed trade, the process 1000 may further include polling market data systems on demand to refresh the federated reference data system for the assigned asset class which the federated reference data system is the system of record.

According to exemplary embodiments, the MDRDMD 402 may include a memory (e.g., a memory 106 as illustrated in FIG. 1) which may be a non-transitory computer readable medium that may be configured to store instructions for implementing MDRDMM 406 for controlling data governance of multi-domainal reference data. The computing device MDRDMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MDRDMM 406 or within the MDRDMD 402, may be used to perform one or more of the methods and processes as described herein. In a particular embodiment, the instructions may reside completely, or at least partially, within the memory 106, the medium reader 112, and/or the processor 104 (see FIG. 1) during execution by the MDRDMD 402.

For example, the instructions, when executed, may cause the processor 104 to perform the following: executing an application that utilizes distribution services or an authoritative data sources cache to confirm that reference data does not exist; creating a message compliant with a standardized information message (SIM) format, wherein the SIM is a standard structured message which includes all data attributes to derive and/or represent reference data record corresponding to the reference data; transmitting the message to a corresponding federated reference data system among a plurality of reference data systems which acts as a system of record to one or more reference data domain classes related to the reference data; and causing the federated reference data system to execute the processes of storing, versioning, and publication of reference data for the classes of reference data for which the federated reference data system is being designated a system of record.

According to exemplary embodiments, the instructions, when executed, may further cause the processor 104 to perform the following: acquiring real time data corresponding to the reference data during time of a trade.

According to exemplary embodiments, the instructions, when executed, may further cause the processor 104 to perform the following: contributing data corresponding to the reference data through a single straight through processing (STP) interface in a standardized information model for contribution to a correct asset class federated reference data system.

According to exemplary embodiments, the instructions, when executed, may further cause the processor 104 to perform the following: causing the federated reference data system to persist the contributed data as-is to staging area; and merging or matching the contributed data with vendor data.

According to exemplary embodiments, the instructions, when executed, may further cause the processor 104 to perform the following: validating the contributed data by checking that a duplicate reference data does not exist; and assigning a globally unique identifier (GUID) to the contributed data based on validating the contributed data.

According to exemplary embodiments, the instructions, when executed, may further cause the processor 104 to perform the following: over writing the contributed data by data at a later point by more accurate internal or external data which can over write the data attributes in whole or in part ensuring that internal fields can be locked which externally obtained data over-writes staler data.

According to exemplary embodiments, when a newly identified reference data is included in an externally executed trade, the instructions, when executed, may cause the processor 104 to further perform: polling market data systems on demand to refresh the corresponding asset class system of record with the most recent data.

Thus, the exemplary embodiments disclosed herein with reference to FIGS. 1-10 may provide platforms for implementing a multi-domainal reference data management module for controlling data governance of multi-domainal reference based on real-time events, thereby allowing to reliably create reference data, store and update in a manner for supporting front to back office requirements, but the disclosure is not limited thereto For example, the various aspects, embodiments, and/or specific features or sub-components of the exemplary embodiments disclosed herein with reference to FIGS. 1-10, may provide, among other features, various systems, servers, devices, methods, media, programs, and platforms for implementing a multi-domainal reference data management module for controlling data governance of multi-domainal reference based on real-time events that supports intra-day; on demand data; supports real time data acquisition during time of trade; supports reference data issuance (for internally issuing reference data—before the market data becomes available); increases operational STP (Straight Through Processing); improves STP of trade data by fast adding reference data without operational intervention, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling multimodal contribution and storage, versioning and publication of multi-domainal reference data by utilizing one or more processors and one or more memories, the method comprising:
executing an application that utilizes data lookup and distribution services or an authoritative data cache to confirm that reference data does not already exist;
creating a message compliant with a standardized reference data message (SIM) format, wherein the SIM is a standard structured message which includes all data attributes to derive and/or represent one or more reference data records corresponding to the reference data;

transmitting the message to a corresponding federated reference data system among a plurality of reference data systems which acts as a system of record to one or more reference data domain classes related to the reference data; and causing the federated reference data system to execute the processes of storing, versioning, and publication of reference data for the classes of reference data for which the federated reference data system is being designated as an asset class system of record.

2. The method according to claim 1, wherein the application includes a financial trade processing application or a middle office application or a back-office application utilized in accounting processes.

3. The method according to claim 1, further comprising:
acquiring real time data corresponding to the reference data during time of a financial trade instruction.

4. The method according to claim 1, further comprising:
contributing data corresponding to the reference data through a single straight through processing (STP) interface in a standardized information model for contribution to the correct reference data system.

5. The method according to claim 4, further comprising:
persisting, by the federated reference data system, the contributed data as-is to staging area; and merging or matching the contributed data with vendor data.

6. The method according to claim 4, further comprising:
validating the contributed data by checking that a duplicate reference data does not already exist; and
assigning a globally unique identifier (GUID) to the contributed data based on validating the contributed data.

7. The method according to claim 1, further comprising:
over writing the contributed data by data at a later point by more accurate internal or external data which can over-write the data attributes in whole or in part ensuring that internal fields can be locked which externally obtained data over-writes staler data.

8. The method according to claim I, wherein when a newly identified reference data is included in an externally executed trade, the method further comprising:
polling market data systems on demand to refresh the system of record (correct federated reference data system) with the most recent data.

9. A system for controlling multimodal contribution and storage, versioning and publication of multi-domainal reference data, the system comprising:
a plurality of federated reference data systems; and
a processor coupled to the plurality of federated reference data systems via communication network, wherein the processor is configured to:
execute an application that utilizes distribution services or an authoritative data sources cache to confirm that reference data does not exist;
create a message compliant with a standardized information message (SIM) format, wherein the SIM is a standard structured message which includes all data attributes to derive and/or represent reference data record corresponding to the reference data;
transmit the message to a corresponding federated reference data system among a plurality of reference data systems which acts as a system of record to one or more reference data domain classes related to the reference data; and cause the federated reference data system to execute the processes of storing, versioning, and publication of reference data for the classes of reference data for which the federated reference data system is being designated as an asset class system of record.

10. The system according to claim 9, wherein the application includes a trade processing application or a middle office application or a back-office application utilized in accounting processes.

11. The system according tip claim 9, wherein the processor is further configured to:
acquire real time data corresponding to the reference data during time of a trade.

12. The system according to claim 9, wherein the processor is further configured to:
contribute data corresponding to the reference data through a single straight through processing (STP) interface in a standardized information model for contribution to a correct federated reference data system for the asset class.

13. The system according to claim 12, wherein the processor is further configured to:
cause the federated reference data system to persist the contributed data as-is to staging area; and
merge or match the contributed data with vendor data.

14. The system according to claim 12, wherein the processor is further configured to:
validate the contributed data by checking that a duplicate reference data does not already exist; and
assign a globally unique identifier (GUID) to the contributed data based on validating the contributed data.

15. The system according to claim 9, wherein the processor is further configured to:
overwrite the contributed data by data at a later point by more accurate internal or external data which can overwrite the data attributes in whole or in part ensuring that internal fields can be locked which externally obtained data over-writes staler data.

16. The system according to claim 9, wherein when a newly identified reference data is included in an externally executed trade, the processor is further configured to:
poll market data systems on demand to refresh the federated reference data system with the most recent data.

17. A non-transitory computer readable medium configured to store instructions for controlling multimodal contribution and storage, versioning and publication of multi-domainal reference data, wherein, when executed, the instructions cause a processor to perform the following:
executing an application that utilizes distribution services or an authoritative data sources cache to confirm that reference data does not exist;
creating a message compliant with a standardized information message (SIM) format, wherein the SIM is a standard structured message which includes all data attributes to derive and/or represent reference data record corresponding to the reference data;
transmitting the message to a corresponding federated reference data system among a plurality of reference data systems which acts as a system of record to one or more reference data domain classes related to the reference data; and
causing the federated reference data system to execute the processes of storing, versioning, and publication of reference data for the classes of reference data for which the federated reference data system is being designated as an asset class system of record.

18. The non-transitory computer readable medium according to claim 17, wherein the instructions, when executed, causes the processor to further perform the following:

acquiring real time data corresponding to the reference data during time of a trade.

19. The non-transitory computer readable medium according to claim 17, wherein the instructions, when executed, causes the processor to further perform the following:

contributing data corresponding to the reference data through a single straight through processing (STP) interface in a standardized information model for contribution to a correct asset class system of record.

20. The non-transitory computer readable medium according to claim 19, wherein the instructions, when executed, causes the processor to further perform the following:

persisting, by the federated reference data system, the contributed data as-is to staging area; and merging or matching the contributed data with vendor data.

\* \* \* \* \*